United States Patent
Lee et al.

(10) Patent No.: US 7,660,941 B2
(45) Date of Patent: Feb. 9, 2010

(54) TWO-LEVEL RAM LOOKUP TABLE FOR BLOCK AND PAGE ALLOCATION AND WEAR-LEVELING IN LIMITED-WRITE FLASH-MEMORIES

(75) Inventors: Charles C. Lee, Cupertino, CA (US);
Frank I-Kang Yu, Palo Alto, CA (US);
David Q. Chow, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 431 days.

(21) Appl. No.: 11/742,270

(22) Filed: Apr. 30, 2007

(65) Prior Publication Data
US 2007/0204128 A1  Aug. 30, 2007

Related U.S. Application Data

(63) Continuation-in-part of application No. 10/957,089, filed on Oct. 1, 2004, and a continuation-in-part of application No. 10/800,228, filed on Mar. 12, 2004, now Pat. No. 7,082,056, and a continuation-in-part of application No. 10/605,140, filed on Sep. 10, 2003, now Pat. No. 6,874,044.

(51) Int. Cl.
*G06F 12/00* (2006.01)
(52) U.S. Cl. ................. 711/103; 711/154; 711/206; 711/221
(58) Field of Classification Search ............. 711/103
See application file for complete search history.

(56) References Cited

U.S. PATENT DOCUMENTS

| | | | |
|---|---|---|---|
| 5,351,210 A | | 9/1994 | Saito |
| 5,515,317 A | | 5/1996 | Wells et al. |
| 5,745,418 A | * | 4/1998 | Ma et al. ............... 365/185.33 |
| 5,942,004 A | | 8/1999 | Cappelletti |
| 5,963,983 A | * | 10/1999 | Sakakura et al. ............ 711/202 |

(Continued)

OTHER PUBLICATIONS

Raz Dan and Rochelle Singer, "Implementing MLC NAND Flash for Cost-Effective, High-Capacity Memory," Sep. 2003.*

*Primary Examiner*—Christian P Chace
*Assistant Examiner*—Kalpit Parikh
(74) *Attorney, Agent, or Firm*—Stuart T. Auvinen; gPatent LLC

(57) ABSTRACT

A restrictive multi-level-cell (MLC) flash memory prohibits regressive page-writes. When a regressive page-write is requested, an empty block having a low wear-level count is found, and data from the regressive page-write and data from pages stored in the old block are written to the empty block in page order. The old block is erased and recycled. A two-level look-up table is stored in volatile random-access memory (RAM). A logical page address from a host is divided by a modulo divider to generate a quotient and a remainder. The quotient is a logical block address that indexes a first-level look-up table to find a mapping entry with a physical block address that selects a row in a second-level look-up table. The remainder locates a column in the row in the second-level look-up table. If any page-valid bits above the column pointed to by the remainder are set, the write is regressive.

18 Claims, 14 Drawing Sheets

U.S. PATENT DOCUMENTS

| | | |
|---|---|---|
| 6,026,015 A | 2/2000 | Hirakawa |
| 6,097,635 A | 8/2000 | Chang |
| 6,097,637 A | 8/2000 | Bauer et al. |
| 7,023,735 B2 | 4/2006 | Ban et al. |
| 7,082,056 B2 | 7/2006 | Chen et al. |
| 7,149,111 B2 * | 12/2006 | Murin et al. ........... 365/185.03 |
| 7,149,871 B2 | 12/2006 | Conley |
| 7,461,198 B2 * | 12/2008 | Tsai et al. .............. 365/185.33 |
| 2003/0174540 A1 | 9/2003 | Fan et al. |
| 2006/0002197 A1 | 1/2006 | Rudelic |
| 2006/0004952 A1 | 1/2006 | Lasser |
| 2006/0101193 A1 | 5/2006 | Murin |

* cited by examiner

FLASH MEM ARRAY
50

DATA AREA — BLOCK ID: FDDD (DATA PBA'S) — 52

| | | |
|---|---|---|
| PBA0 | DATA X8 PAGES | SPARE |
| PBA1 | DATA X8 PAGES | SPARE |
| PBA2 | ⋮ | ⋮ |
| PBA8 | DATA X8 PAGES | SPARE |
| PBA9 | DATA X8 PAGES | SPARE |

WEAR-LEVELING CNTR POOL — X8 PAGES/BLK — BLOCK ID: FEEE (WL PBA'S) — 56

| | | | | |
|---|---|---|---|---|
| PBA20 | PBA0_WL | PBA1_WL | ••• | PBA127_WL |
| PBA21 | PBA0_WL | PBA1_WL | ••• | PBA127_WL |
| PBA22 | PBA0_WL | PBA1_WL | ••• | PBA127_WL |
| | PBA0_WL | PBA1_WL | ••• | PBA127_WL |
| ⋮ | | | | |
| PBA30 | PBA0_WL | PBA1_WL | ••• | PBA127_WL |

BAD BLKS — BAD BLOCK ID SET (BAD PBA'S) — 54

| | | |
|---|---|---|
| PBA5 | DATA X8 PAGES | SPARE |
| PBA7 | DATA X8 PAGES | SPARE |
| PBA11 | ⋮ | ⋮ |
| PBA57 | DATA X8 PAGES | SPARE |
| PBA89 | DATA X8 PAGES | SPARE |

FIG. 1A

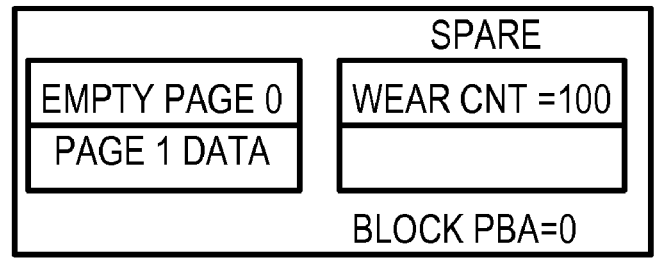
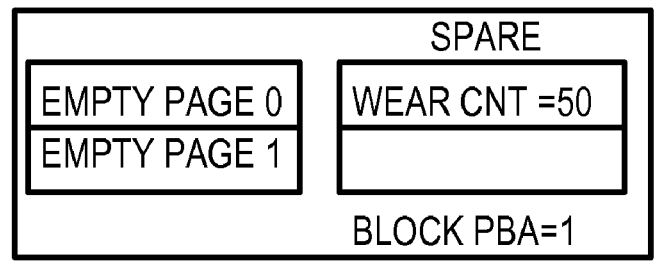
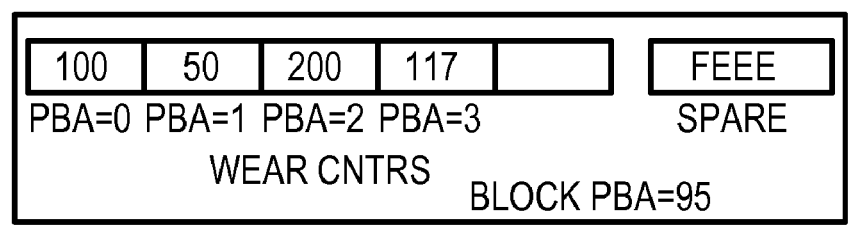
FIG. 5A

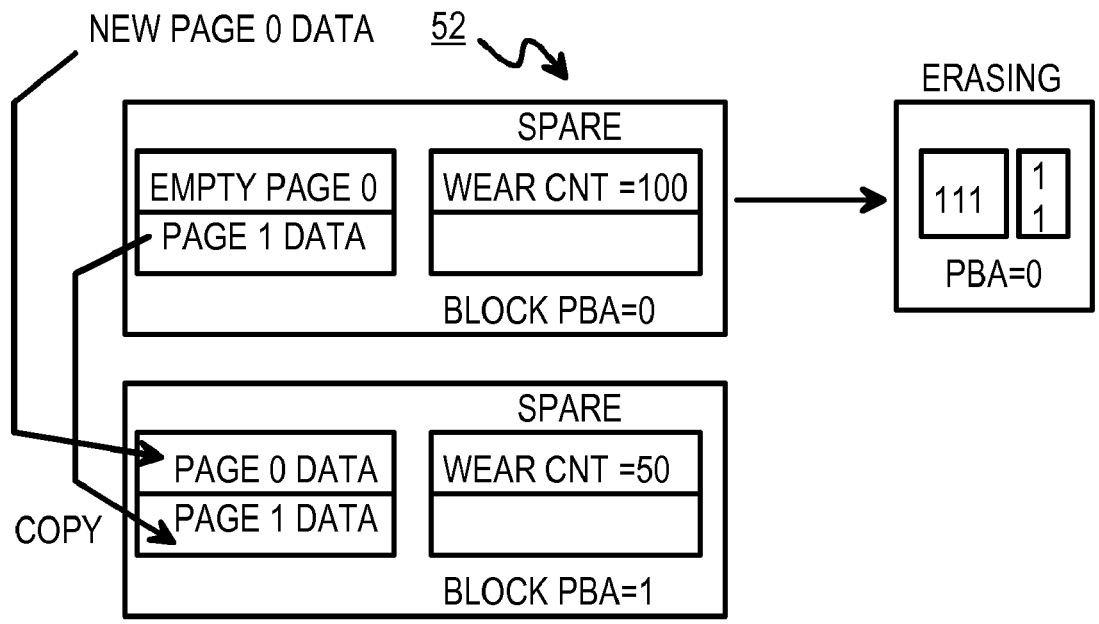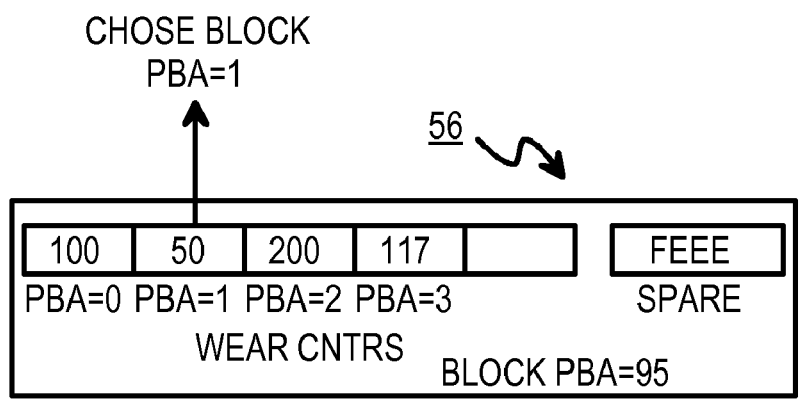
FIG. 5B

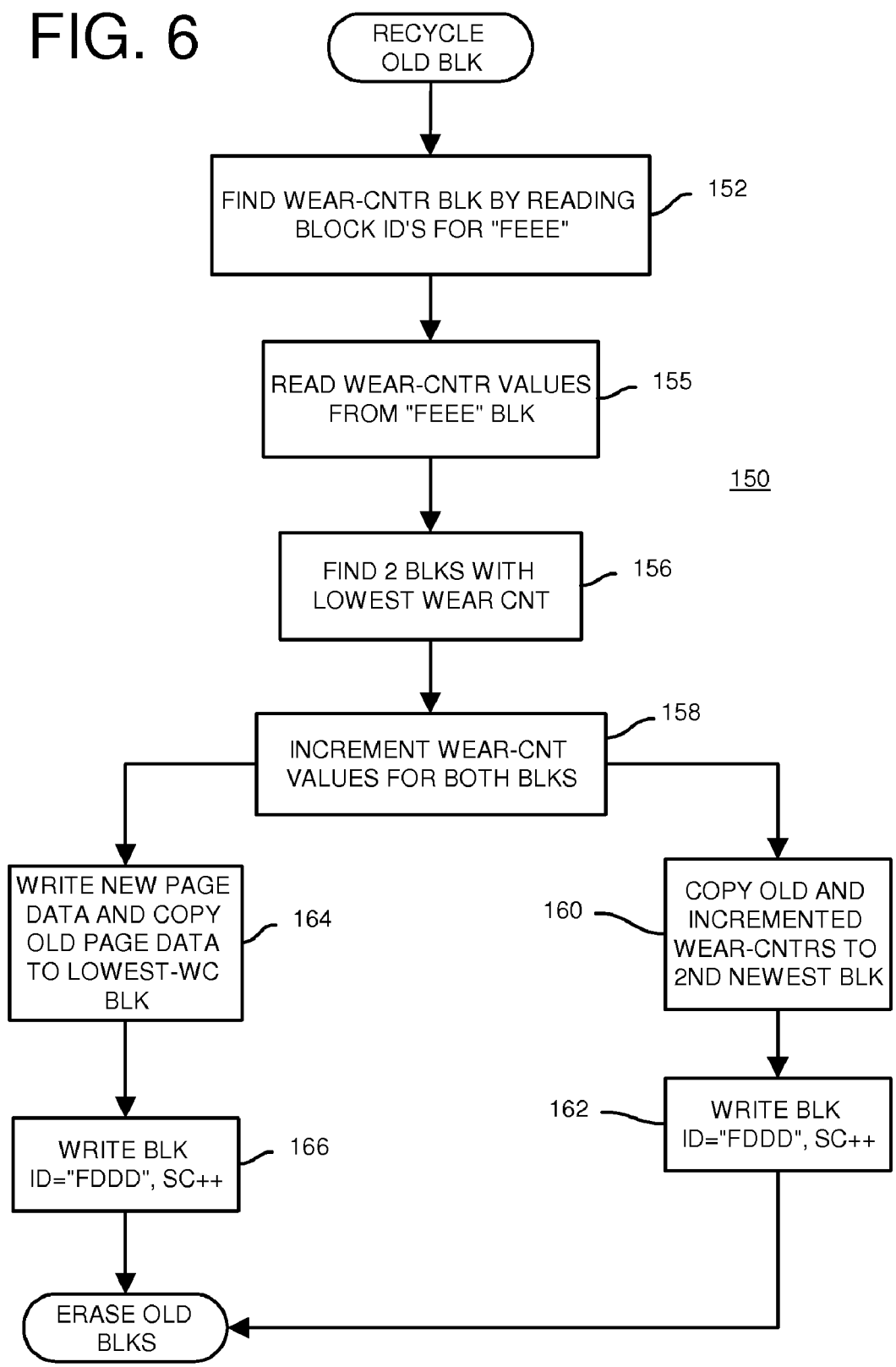

TWO-LEVEL RAM LOOKUP TABLE FOR BLOCK AND PAGE ALLOCATION AND WEAR-LEVELING IN LIMITED-WRITE FLASH-MEMORIES

RELATED APPLICATION

This application is a continuation-in-part of the co-pending application for "Flash Card Systems", U.S. Ser. No. 10/957,089, filed Oct. 1, 2004.

This application is related to "Flash memory device and architecture with multi level cells", U.S. Ser. No. 10/800,228, filed Mar. 12, 2004, now U.S. Pat. No. 7,082,056, and "Flash drive/reader with serial-port controller and flash-memory controller mastering a second RAM-buffer bus parallel to a CPU bus", U.S. Ser. No. 10/605,140, filed Sep. 10, 2003, now U.S. Pat. No. 6,874,044.

FIELD OF THE INVENTION

This invention relates to multi-bit-cell (MBC) or multi-level-cell (MLC) flash-memory systems, and more particularly to sequencing of page writes in restricted-write memories.

BACKGROUND OF THE INVENTION

Rotating hard-disk drives are often used in personal computers (PC's), servers, video recorders, and many other kind of electronic devices for mass storage. Mass storage is used to store large amounts of data that is typically copied to a faster random-access memory such as a dynamic-random-access memory (DRAM) for use by a processor. While the processor's DRAM is randomly accessible, mass storage is block-accessible. An entire block of data must be read or written from the mass storage device. A RAM may allow reading and writing of individual bytes or words of 4 or 8 bytes, while a mass storage device requires that a sector or 512 bytes or more be read or written together.

Flash memory may also be used as a mass storage device in lieu of a hard disk. Flash-memory arrays are also block-accessible, but have a much faster access time than rotating media such as a hard disk. However, since flash memory chips are block-addressable rather than randomly-accessible, flash is not as easy to use for a cache as DRAM or SRAM.

A host generates a logical sector addresses (LSA) of a 512-byte block of data to be read or written from a mass storage device. Flash memory can only be erased a block at a time. A flash memory manager converts LSA logical addresses from a host PC into physical block addresses (PBA) that identify physical blocks of data in the flash memory. The flash memory manager may use re-mapping tables to perform the address translation, and may perform other flash-related functions such as wear-leveling to spread erasures over blocks in flash memory. An erase count may be kept for each block in flash memory, and the block with the lowest erase count is selected to receive new data.

While an entire block has to be erased together, pages within a block could be written and over-written several times. Some older flash memory chips may allow over-writing of pages that have previously been written. Blocks with all stale pages could be erased and re-used. These older flash memories were thus fairly easy to use, especially when over-writing.

Older flash memory chips used electrically-erasable programmable read-only memory (EEPROM) memory cells that stored one bit of data per memory cell. Each cell could be in one of two states. When the floating gate in the flash memory cell was charged with electrons, a higher (more positive) gate voltage is needed to turn on the conducting transistor channel. When the floating gate in the flash memory cell was not charged with electrons, a lower (less positive) gate voltage is needed to turn on the conducting transistor channel.

Newer multi-level-cell (MLC) flash memory use EEPROM memory cells that stored two, four, or more bits of data per memory cell. Different amounts of charge stored on the floating gates produce different current and different sensing voltages for the same memory cell. Thus a single memory cell can store multiple bits of information by assigning different voltages to different logic levels.

Multi-level-cell flash memory can store a higher density than single-level cell flash for the same cell size. Thus multi-level cell flash is likely to be used more frequently for higher-density flash chips made now and in the future.

However, MLC flash chips may impose additional restrictions on usage. For example, a MLC flash chip may not allow pages to be written a second time before erase, such as for number-of-page-programming NOP=1 chips. Instead, the entire block must be erased before any page can be written again. Each page may be written only once after each erase. Alternately, some writing may be allowed, such as writing a 1 bit to a 0 bit, but other writes are not allowed, such as writing a 0 bit to a 1 bit.

Some MLC flash chips may be even more restrictive. Some MLC flash chips may require pages to be written in a sequence within a block. These restrictive MLC chips may prohibit "backwards" writing, but only allow "forward" writing, although some pages may be skipped when writing data in.

Another problem with MLC cells, especially with many states per cell, is that the noise margins are very small. Over time, floating gates can gain or lose charge. Programming or reading adjacent cells may disturb stored charge, or leakage may occur. The restriction on page-write order may help reduce these problems.

While MLC cells with a high number of states per cell are desirable for improved density, the restrictions on page-write ordering make prior-art flash controllers obsolete. Sequencers for restrictive MLC flash memory is desirable.

What is desired is a flash memory manager for restrictive MLC flash memory. A flash memory controller that writes in and re-locates flash blocks to avoid out-of-order page writes is desirable.

BRIEF DESCRIPTION OF THE DRAWINGS

FIG. 1A shows an arrangement of physical blocks in a flash-memory array.

FIGS. 5A-D highlight wear-level counter updates.

FIG. 6 is a flowchart of a block recycling routine.

DETAILED DESCRIPTION

Figure 1B:
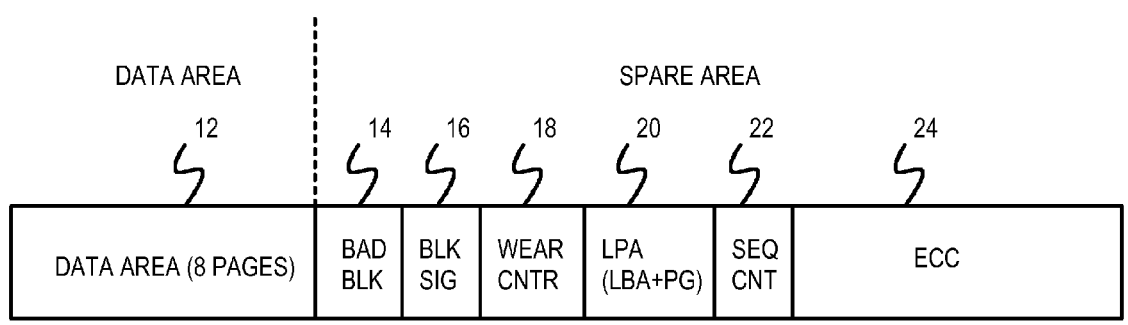
FIG. 1B shows fields in a flash block, including the spare area.

The present invention relates to an improvement in flash memory controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 1A shows an arrangement of physical blocks in a flash-memory array. Flash-memory array 50 contains one or more MLC flash-memory chips that are block-addressable. The data in a block may be erased to all 1's, and then written with 0's. However, data may not be written from 0 back to 1 without erasing the whole block. There are also additional restrictions on write order. Pages may only be written in an ascending order, such as pages 0, 1, 2, 5, 7. Pages may not be written in a regressing order such as 0, 4, 5, 1, 7, since regressing or going "backwards" to write page 1 after pages 4, 5 have been written is illegal. This restriction for multi-level memory is needed to prevent illegal state changes for multi-level cells.

Each block contains 8 pages in this simplified embodiment, although larger numbers of pages such as 128 pages per block are contemplated in more realistic embodiments. Data from a host or user is stored in data area 52. Data area 52 has 10 physical blocks, PBA0, PBA1, . . . PBA9, but could have more blocks such as 32, 37, 40, 64, 256, etc. in larger embodiments. Each physical block has 8 pages, and each page stores a sector of host data, the LSA logical sector address for that page's data, and valid bits. Other embodiments may store 4K pages with 8 sectors per page.

Each physical block also stores a block identifier and perhaps other block information in a spare area. The block ID for each block in data area 52 is set to FDDD in this example, or some other ID number in another embodiment.

A second area of flash-memory array 50 is used to store wear-leveling information. Physical blocks PBA20 to PBA30 are in wear-leveling-counter pool 56. All blocks in wear-leveling-counter pool 56 have their block ID set to FEEE to distinguish them from data blocks in data area 52. A 4-byte wear counter can allow for more than 10K writes, and many 4-byte counters can be contains in each page.

Each physical block in wear-leveling-counter pool 56 contains eight pages, and each page contains up to 127 wear-leveling counters. Each physical block in data area 52 and in wear-leveling-counter pool 56 has a wear-leveling counter. These wear-leveling counters are labeled PBA0_WL, PBA1_WL, PBA2_WL, . . . PBA126_WL, PBA127_WL.

For a page of 512 bytes, each of the 127 counters may be 4 bytes, and able to count to 4G. A wear-leveling counter is incremented each time a block is erased, so up to 4G erases per block are supported, which is much larger than 100,000 erase cycles commonly supported.

Each page of each block in wear-leveling-counter pool 56 contains all 127 wear-leveling counters. Only one of the pages in wear-leveling-counter pool 56 contains the most recent and currently-valid wear-leveling counters for the whole cache system. The other pages are redundant, containing stale wear-leveling counters, or blank counters for future use.

As physical blocks are erased and the blocks' wear-leveling counters are incremented, it may be necessary to change a bit in a wear-leveling counter from 0 to 1. This can only happen when the whole block that contains the wear-leveling counter is erased. Since the wear-leveling counters would be destroyed by an erase, all of the wear-leveling counters are copied to a blank block in wear-leveling-counter pool 56 before the old block is erased. Then the values of the wear-leveling counters are not lost, but merely transferred to a new block in wear-leveling-counter pool 56. The old block with the stale wear-leveling counters can then be erased and recycled into wear-leveling-counter pool 56.

Bad block area 54 contains faulty blocks of flash memory that can no longer be used for host data or for wear-level counters. Bad blocks can be identified by having their block ID's set to values other than FEEE or FDDD, such as 0000. The block ID can have some faulty bits and still be able to be identified as a bad block, as long as the block ID's do not match FEEE or FDDD.

Blocks in data area 52, wear-leveling-counter pool 56, and bad block area 54 do not have to be contiguous. Bad blocks may cause holes in the block sequence in data area 52 or in wear-leveling-counter pool 56.

FIG. 1B shows fields in a flash block, including the spare area. A flash block has 8 pages (or some other number of pages) for storing host data in data fields 12. The spare area includes error-correction code (ECC) 24, which contains bits that can be used to detect and correct errors in data fields 12, such as by using Reed-Solomon code and syndromes. Each page can have its own ECC, sequence count, and LPA values.

Sequence count 22 is incremented each time the page data in data fields 12 is written in or relocated to a new physical blocks. Sequence count 22 acts as something of a timestamp and is useful for recovery after a power failure.

Logical page address LPA field 24 contains the logical block address (LBA) and the page number. There may be several LPA fields 24, such as one for each page, or even one per sector. Wear counter 18 contains a local copy of the wear counter for this block, separate from the wear counters in wear-leveling-counter pool 56 (FIG. 1A). Wear counter 18 is set to all 1's (FFFF) for bad blocks.

Block signature field 16 contains the block ID, such as FDDD for data blocks, and FEEE for wear-leveling-counter pool blocks. Bad block field 14 is set to indicate that the block is bad. bad block field 14 can be set by software or by the manufacturer, and can indicate to the flash manager that the block should be removed from the host data or wear-leveling-counter pool.

Figure 2:
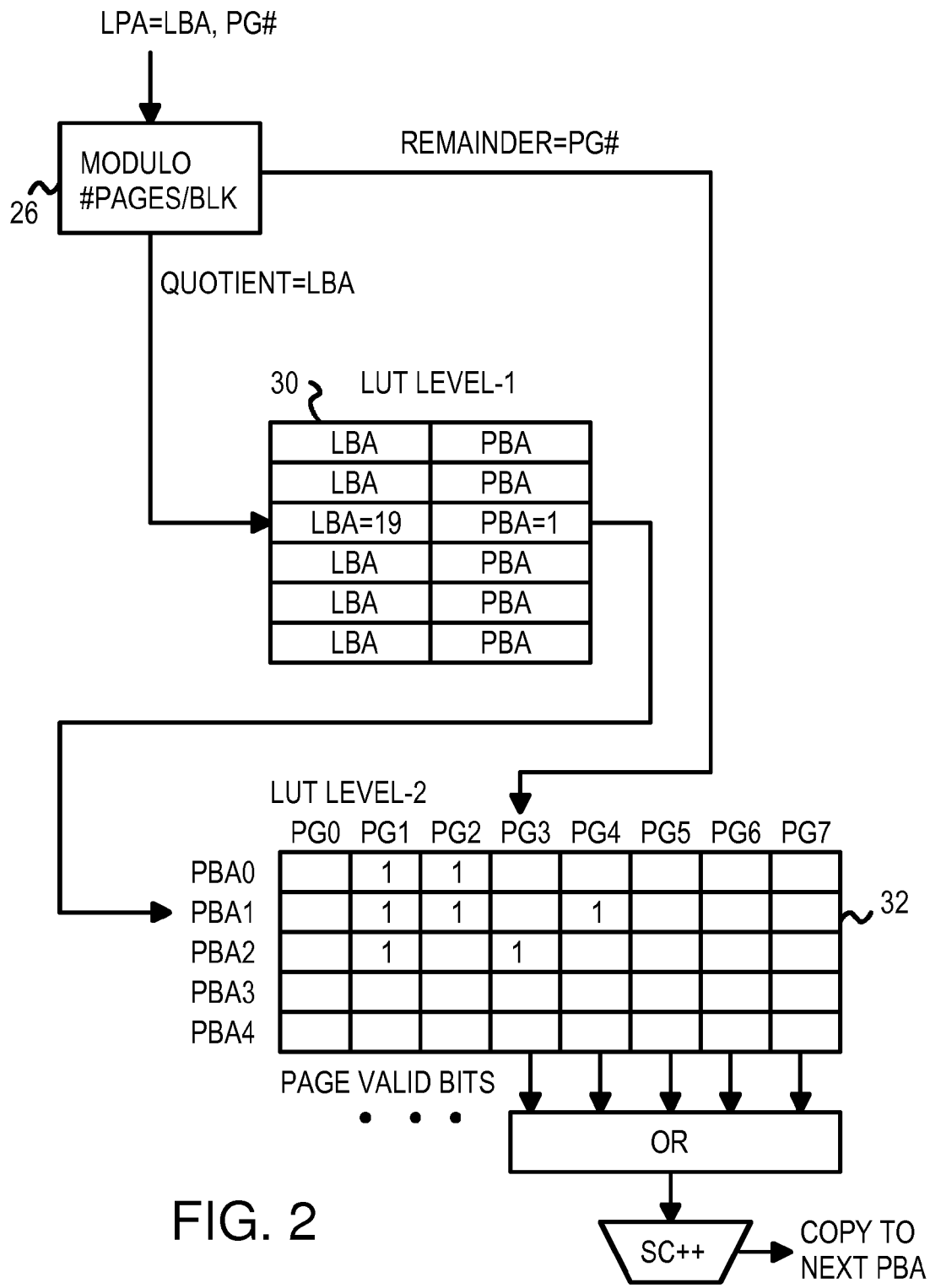
FIG. 2 shows a 2-level lookup table for preventing regressive page writes.

FIG. 2 shows a 2-level lookup table for preventing regressive page writes. A logical page address (LPA) has a logical block address (LBA) and a page number or page offset within the block. Modulo divider 26 divides the LPA by the number of pages per block to generate a quotient and a remainder. The remainder is the page number and is applied directly to second-level look-up table 32. The quotient from modulo divider 26 is the LBA block address and is used to index into first-level look-up table 30.

First-level look-up table 30 contains logical-to-physical block mappings. Each entry has an LBA and PBA mapping. For example, LBA 19 is mapped to PBA 1 by first-level look-up table 30. First-level look-up table 30 can be a fully-associative, direct-mapped, set-associative, or other kind of table.

First-level look-up table 30 finds the PBA that stores the data for the LBA from the host that was extracted by modulo divider 26. This PBA from first-level look-up table 30 becomes the index into second-level look-up table 32. Second-level look-up table 32 contains rows for each physical block of flash memory in use, and columns that correspond to pages within the physical block. The page number remainder from modulo divider 26 locates the column in second-level look-up table 32, while the PBA read from first-level look-up table 30 locates the row in second-level look-up table 32.

Each intersection of a PBA row and a page # column in second-level look-up table 32 contains a page-valid bit. Pages that contains valid data have a valid bit that is set to 1, while invalid pages have cleared valid bits equal to 0 (not shown). For example, block PBA0 has pages 1, 2 valid and the other pages invalid or not yet written (erased). PBA1 has pages 1, 2, 4 valid. Block PBA2 has pages 1, 3 valid.

The page valid bits for the selected block are applied to OR logic that forms the logical OR of the upper bits at and above the column pointed to by the page-number remainder from modulo divider 26. For example, when PBA1 is selected and page 3 is the remainder, the valid bits for pages 3, 4, 5, 6, 7 of PBA 1 are OR'ed together.

When the OR result is 0, none of the higher pages have been written. The current page write is not out-of-order. The current page write is allowed to proceed in the current block PBA1, and the page-valid bit for PG3 is eventually set.

When the OR result is 1, one or more of the higher pages have been written. The current page write is out-of-order, or regressive, since a lower page # is being written. This regressive writing is illegal for restrictive MLC flash chips. The sequence count is incremented, and the existing page data in this block is relocated to a new empty block. The current page is then written to the new empty block. The page-valid bits for the old block PBA1 are cleared, and the old page-valid bits copied to the row for the new empty block that is the relocation target.

Figure 3A:
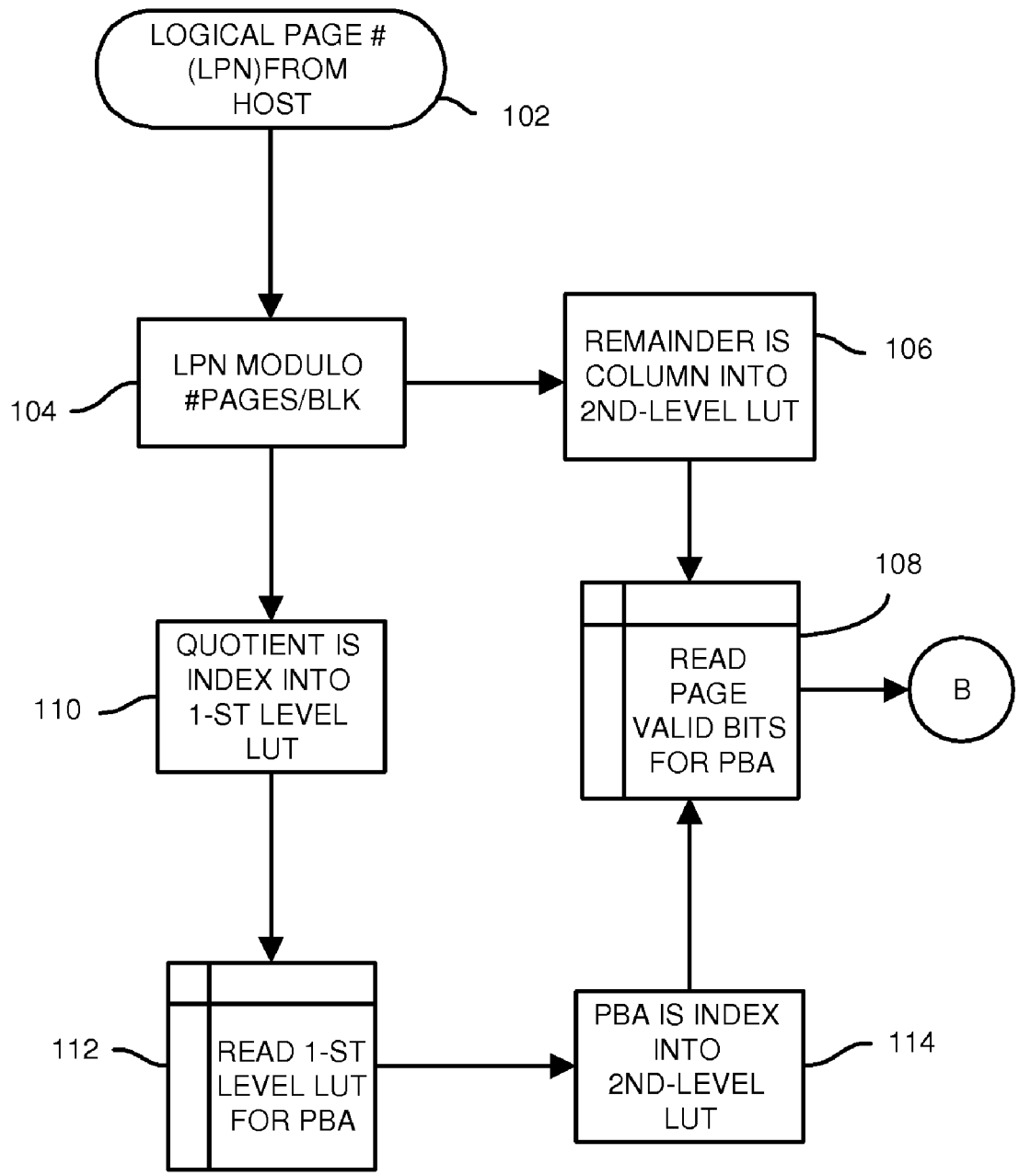
FIGS. 3A-B show a flowchart of writing pages to a restrictive MLC flash memory using a two-level look-up table.
Figure 3B:
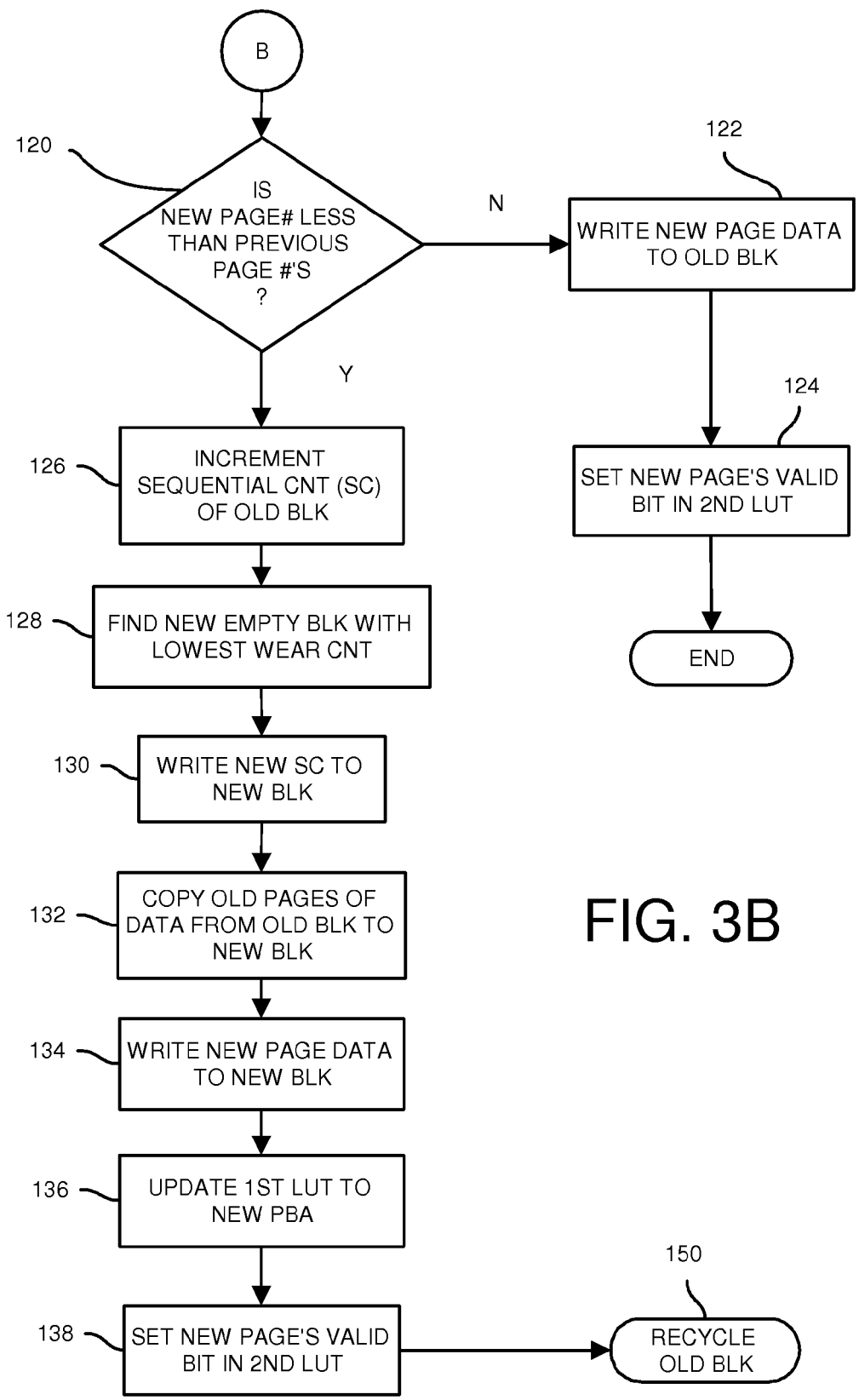

FIGS. 3A-B show a flowchart of writing pages to a restrictive MLC flash memory using a two-level look-up table. The host sends a logical page number (LPN) that includes a LBA and a page number, step 102. The LPN is divided into a quotient and a remainder, such as by using a modulo divider, or by partitioning bits when the number of pages per block is a power of 2, step 104. The quotient is the index into the first-level look-up table, step 110, which locates a PBA for that LBA, step 112. The PBA read from the first-level look-up table is the index into the second-level look-up table, step 114, which selects a row in the second-level look-up table.

The remainder from the modulo divider is the page number. The page number identifies a column in the second-level look-up table, step 106. The page valid bits for pages having a higher or equal page number are read and OR'ed together, step 108.

In FIG. 3B, OR'ing the page-valid bits above and equal to the selected column in the second-level look-up table quickly determines when regressive page-writing is requested, step 120. In regressive page writing, the new page number is less than an existing page number of a page that was previously written to this physical block. Regressive page writes are illegal for restrictive MLC flash chips.

When regressive writing is not detected, step 120, then the new page data can be written to the current physical block PBA that was found in the first-level look-up table, at the page number of the remainder, step 122. The new page number has its page-valid bit set, step 124. The page write is now completed.

When regressive writing is detected, step 120, then a new physical block must be allocated, and the old page data relocated to the new block. The sequential count SC read from the old physical block is incremented, step 126 to form, the new sequential count for the new block. A new empty block is found, preferably with the lowest wear-level count, step 128. The new sequential count SC is written to the spare area of the new block, step 130.

The data in pages from the old block that are valid are copied to the corresponding pages in the new block, step 132. The new page data from the host is also written to the new block at the page matching the page number (remainder), step 134. Steps 132, 134 occur together so that the new and old pages are written in page order, rather than out-of-order. Thus regressive page-writing is avoided.

Once the data pages have been successfully copied to the new block, the mapping entry in the first-level look-up table is updated with the new PBA, step 136. The LBA now points to the new PBA with the copied data, rather than to the old PBA with the original data. The page-valid bit for the new page is then set, at the row and column pointed to by the new PBA and the page number. The row in the second-level look-up table can be re-defined as being for the new PBA, or the old page-valid bits can be copied to the new PBA's row in second-level look-up table, before the old row's page-valid bits are cleared. The old PBA can be recycled for re-used, step 150. The old block can be erased by a recycling routine such as shown later in FIG. 6.

Figure 4A:
FIGS. 4A-F show an example of a sequence of page-writes to the restrictive flash memory using the two-level look-up table.

FIGS. 4A-F show an example of a sequence of page-writes to the restrictive flash memory using the two-level look-up table. In FIG. 4A, LBA 51, page 2 is being written to a logical block that is empty. The mapping of LBA 51 to PBA 0 is loaded into first-level look-up table 30, and the page-valid bit for page 2 is set in the entry for PBA0 in second-level look-up table 32.

Figure 4B:
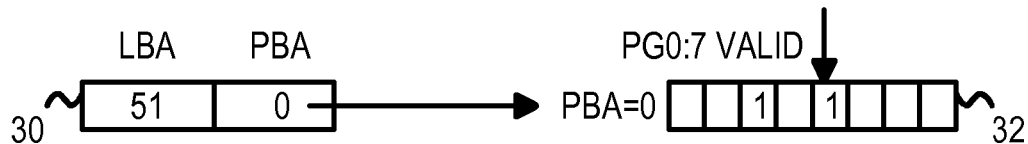

In FIG. 4B, a write occurs to page 4 of the same LBA 51. PBA0 is found in the entry for LBA 51 in first-level look-up table 30, and the row for PBA0 is found in second-level look-up table 32. The page-valid bit for page 3 is set in this row, since all the page-valid bits above page 3 are 0 (0's are not shown, only 1's).

Figure 4C:
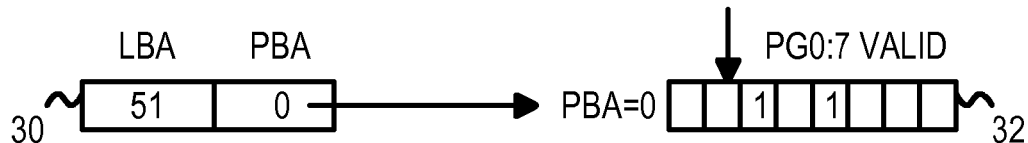

In FIG. 4C, a regressive page-write occurs. Page 1 is being written, but pages 2, 4 have already been written in the same block PBA0 (LBA51). Such regressive page-writes are not allowed within the same physical block for restrictive memories. The regressive page-write can be found by OR'ing all the page-valid bits above the current page 1. Since pages 2, 4 are already valid, the OR result is 1, indicating an illegal page-write.

Figure 4D:
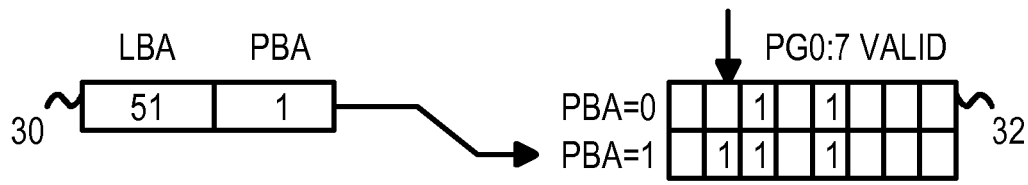

In FIG. 4D, the old block is relocated to a new block because of the regressive page-write in FIG. 4C. When the regressive page-write is detected, a new empty block is located and the mapping entry in first-level look-up table 30 is changed to point to the new physical block. LBA51 now maps to PBA1 rather than to PBA0. The old page-valid bits from the PBA0 row in second-level look-up table 32 are copied to the new row for PBA1 in second-level look-up table 32. The new page 1 data is written to the new block PBA1, and the data for pages 2, 4 are also copied from the data fields of the old PBA0 to the new PBA1. The page-valid bit for page 1 is set in the new block PBA1. PBA0 can be submitted for recycling. Once PBA0 is erased, its page-valid bits are cleared.

Figure 4E:
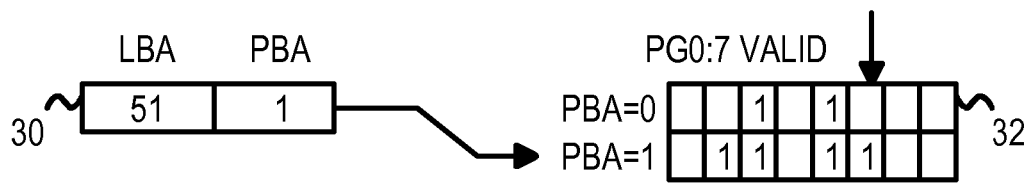

In FIG. 4E, a write occurs to page 5 of the same LBA 51. PBA1 is found in the entry for LBA 51 in first-level look-up table 30, and the row for PBA1 is found in second-level look-up table 32. The page-valid bit for page 5 is set in this row, since no regressive write is detected as all the page-valid bits above page 5 are 0.

Figure 4F:
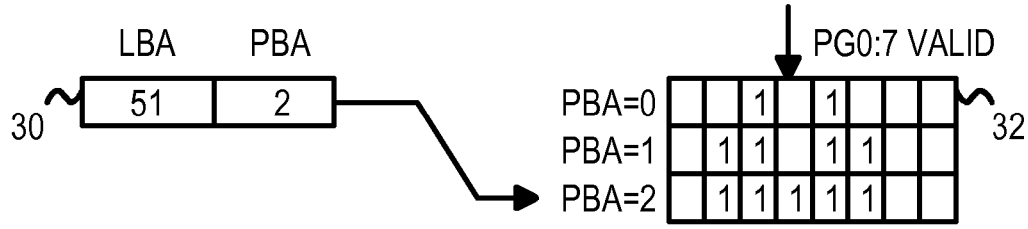

In FIG. 4F, another regressive page-write occurs. Page 3 is being written after pages 1, 2, 4, 5. Since pages 4, 5 are above page 3, a regressive write is detected by the OR logic. A new page PBA2 is allocated and loaded into the mapping entry for PBA51 in first-level look-up table 30.

The old page-valid bits from the PBA1 row in second-level look-up table 32 are copied to the new row for PBA2 in second-level look-up table 32. The old pages 1, 2 data are written to the new block PBA2, and then the new page 3 data, followed by the old pages 4, 5 data. The page data is thus written into the new physical block in ascending order.

The page-valid bit for page 3 is set in the new block PBA2, and the page-valid bits for old pages 1, 2, 4, 5 are set. PBA2 can be submitted for recycling. Once PBA2 is erased, its page-valid bits are cleared.

Figure 5C:
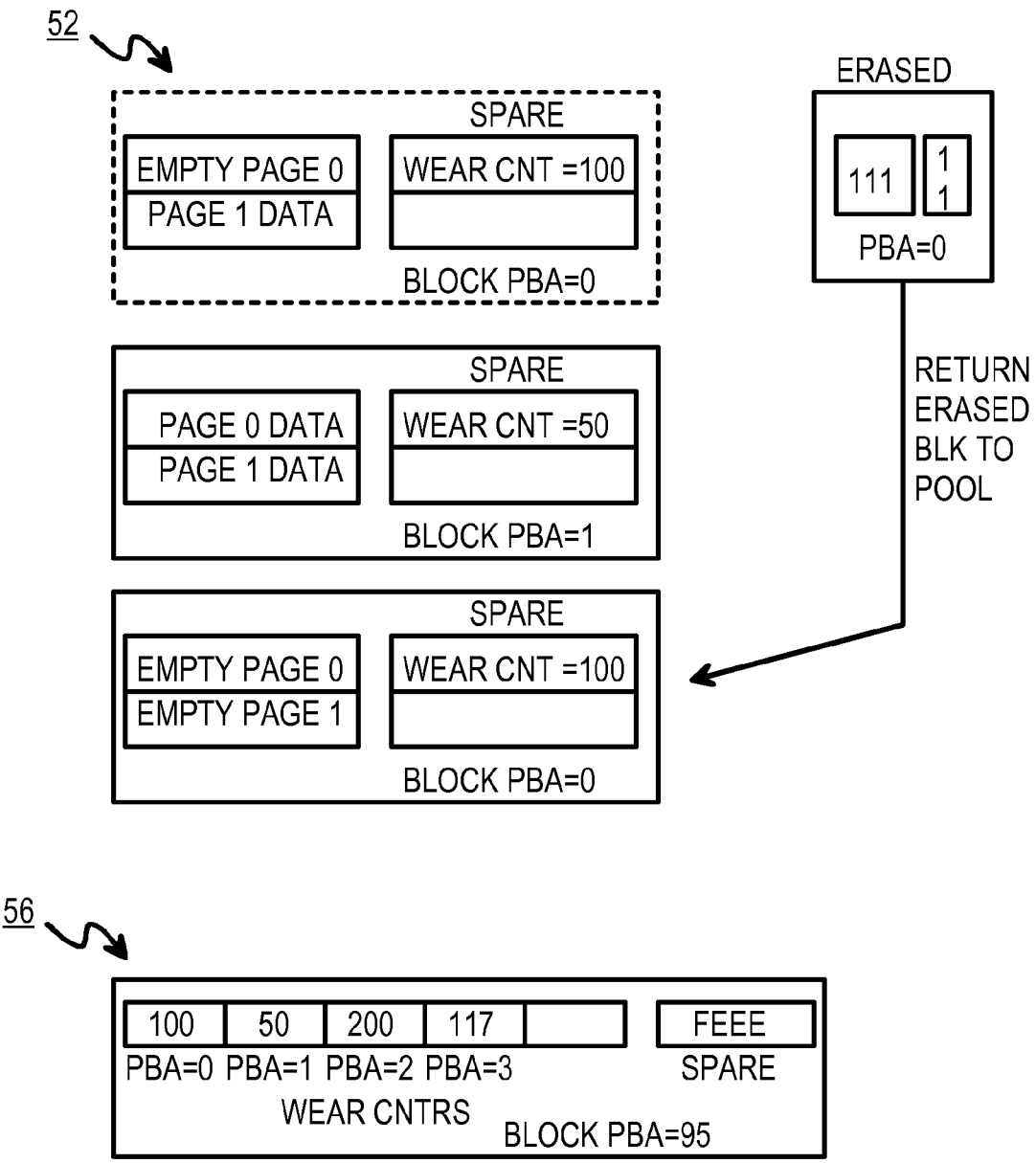

FIGS. 5A-D highlight wear-level counter updates. In FIG. 5A, physical block PBA0 has data in page 1, and has a wear count value of 100 stored in the spare area for the block. Physical block PBA1 is erased and has empty pages 0, 1 and a wear count value of 50 stored in its spare area. Blocks PBA0, PBA1 are in data area 52.

Physical block PBA95 is part of wear-leveling-counter pool 56. Block PBA95 holds the current wear-leveling counters, up to 127 counters. It's block ID in its spare area is set to FEEE, while blocks in data area 52 have their block ID's set to FDDD.

The wear count values of 100 for block PBA0 and 50 for block PBA1 are also stored in block PBA95. Wear-counter values for other blocks are also stored in this wear-leveling-counter pool block, such as wear count values of 200 and 117 for blocks PBA2 and PBA3, respectively.

In FIG. 5B, new data is being written into page 0 of physical block PBA0. However, since page 1 has already been written in block PBA0, the page-write is an illegal regressive write. Empty block PBA1 is chosen to receive the merged data from the new page 0 and from old block PBA0, since PBA1 has the lowest wear count value (50) of any blocks. The block with the lowest wear count value can quickly be found by examining the wear count values in block PBA95 in wear-leveling-counter pool 56.

The new page 0 data from the host is written into page 0 of new block PBA1, while the old page 1 data from old block PBA0 is copied into new block PBA1. Old block PBA0 can now be erased. Erasing can be relatively slow and take many cycles for flash memory.

In FIG. 5C, once old block PBA0 has been erased, it can be returned to data blocks 52 as an empty block. However, the wear counter for erased block PBA0 needs to be incremented.

Figure 5D:
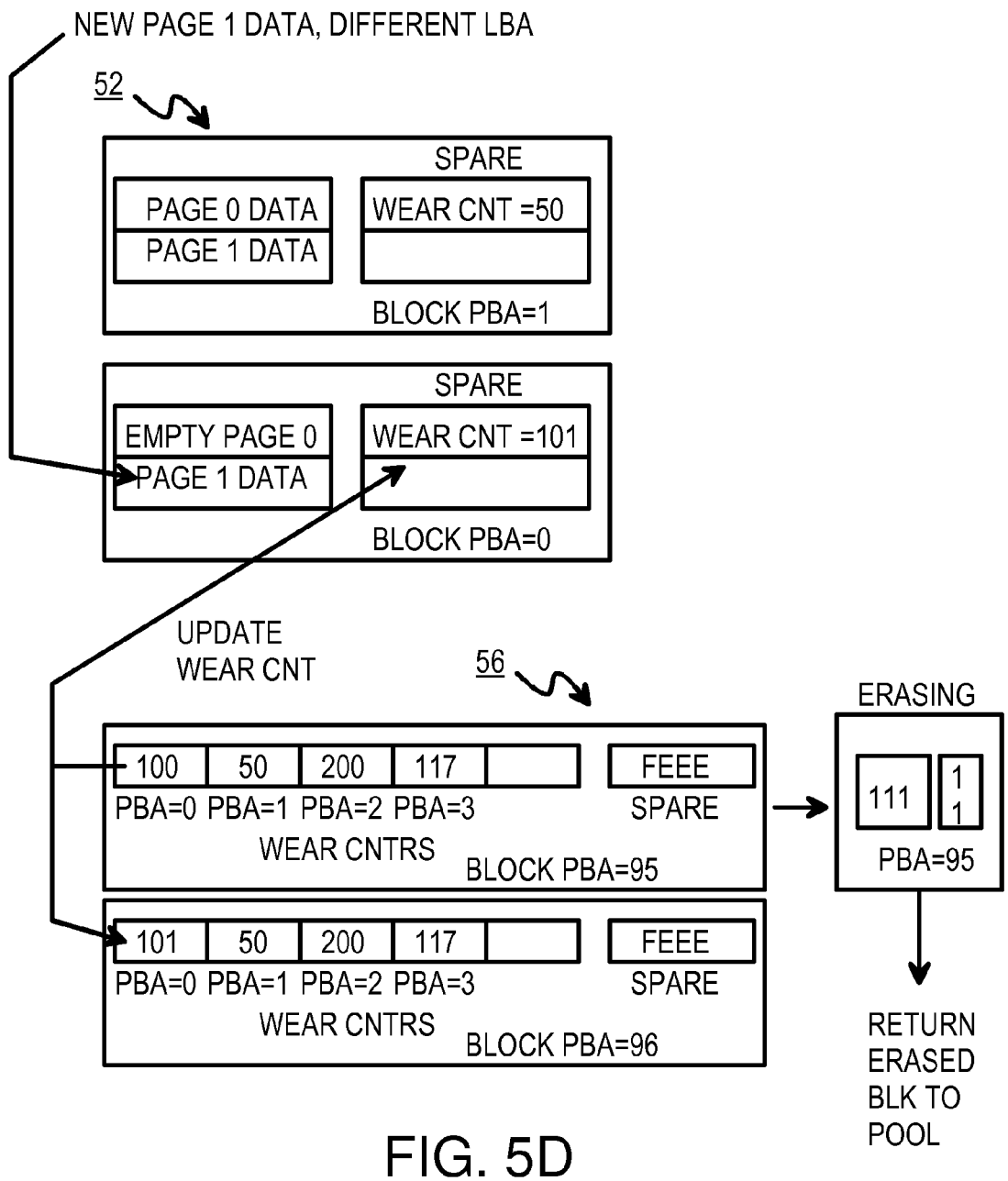

In FIG. 5D, the wear counter for erased block PBA0 is incremented, causing the wear counters to be relocated to a new block in the wear-leveling-counter pool. Page 1 data for a new LBA is received from the host and needs to be allocated to an empty block, since this new LBA differs from the old LBA mapped to PBA1.

Examining the wear counters in block PBA95 in wear-leveling-counter pool 56 shows that block PBA1 has the lowest wear count, but PBA1 is not empty. PBA0 has the next-lowest wear count, and PBA0 is empty and available. However, the wear count value needs to be incremented from 100 to 101 once the new data (page 1) is written into block PBA0. The new wear count value of 101 is written into the spare area of block PBA0.

However, since all pages of block PBA95 have already been written with the wear count values, going back and over-writing the wear count value for block PBA0 is an illegal regressive write. Instead, the wear count values from block PBA95 are relocated to a new empty block in wear-leveling-counter pool 56, such as block PBA96. The new wear count value of 101 for PBA0 is written to new block PBA96, along with the old wear count values for other blocks. Then old counter block PBA95 may be erased.

Block PBA96 could be chosen as the next sequential block in wear-leveling-counter pool 56, or as the block in wear-leveling-counter pool 56 with the lowest wear count value.

FIG. 6 is a flowchart of a block recycling routine. recycling routine 150 may be executed periodically rather than just after a block has been tagged for recycling. Blocks in the wear-leveling-counter pool are located by reading the block ID's of all blocks. Blocks with a block ID of FEEE are in the wear-leveling-counter pool, step 152. One of the FEEE blocks has the current wear level counter values, while other blocks are erased or being erased. The wear count values are read from the FEEE block that is not erased, and has the highest sequential count, step 155. Erased blocks may be identified by a block ID of FFFF or by some other means. The two erased blocks with the lowest wear level count are found by examining the wear count values in the FEEE block, step 156. The wear count values for both of these blocks are incremented, step 158.

The block with the lowest wear level count is loaded with the relocated and new page data, step 164. Information in the spare area is also written. For example, the block ID is set to FDDD and the sequential count SC is incremented, step 166. The old data block can then be erased.

The block with the second-lowest wear level count is added to the wear-leveling-counter pool. The incremented wear level count for the new block or the old erased block is written into this block, and the other wear counters are copied from the old wear level counter block to this block, step 160. The block ID for this block is set to FEEE to identify it as the wear level counter block, and its sequential count SC is incremented, step 162. The old wear level count block can be erased.

Figure 7:
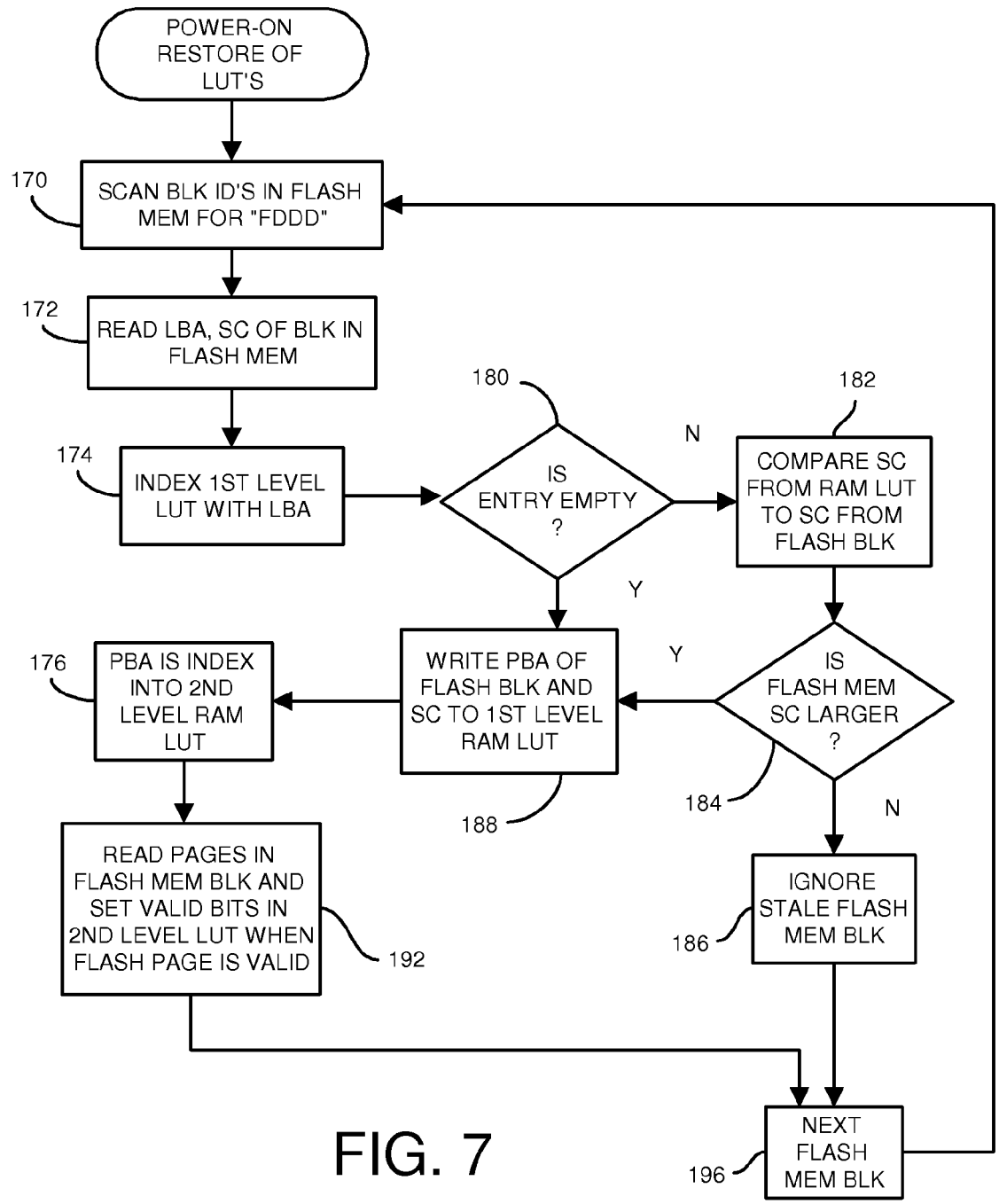
FIG. 7 is a flowchart of restoring the two-level look-up table after power is lost.

FIG. 7 is a flowchart of restoring the two-level look-up table after power is lost. The two-level look-up table can reside in volatile memory such as static random-access memory (SRAM). The contents are lost when power fails. When power resumes, the restore routine scans all physical blocks of flash memory for the block ID's. Blocks having a block ID of FDDD are data blocks, step 170. The LBA and sequence count SC for the data block found in step 170 are read from the block's spare area, step 172.

The LBA read from the spare area of the flash block is used as an index into the first-level look-up table, step 174, to locate a mapping entry. When the mapping entry is empty, step 180, then the PBA of the FDDD flash block found in step 170 is written to this mapping entry, step 188, along with the SC. When the first-level look-up table is associative, the LBA is also written into the entry.

The PBA is then the index into the second-level look-up table, step 176. Pages from the physical block are read from flash memory to determine when valid data is in those pages. Pages with valid data have their page-valid bits set in the second-level look-up table, step 192. The next flash block can be processed, step 196.

When the mapping entry in the first-level look-up table is not empty, step 180, then the sequential count of the existing mapping entry in the first-level look-up table is compared to the sequential count read from the flash block, step 182. When the sequential count from the flash memory block is larger than in the mapping entry, step 184, then the flash block is fresher, more recent. The Flash block's PBA and SC replace the existing mapping entry, steps 188, 176, 192.

When the sequential count from the flash block is smaller than the sequential count in the mapping entry in the first-level look-up table, step 184, then the flash block contains stale data. The mapping entry points to fresher data. The flash block is ignored, step 186. The next flash block can be processed, step 196.

Figure 8A:
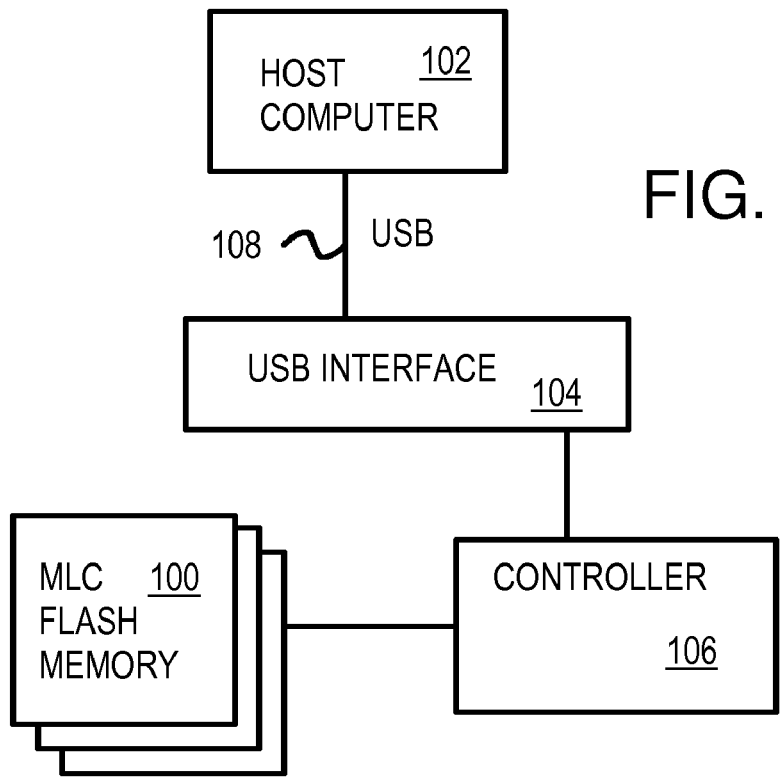
FIGS. 8A-C show application environments of the two-level look-up table.
Figure 8B:
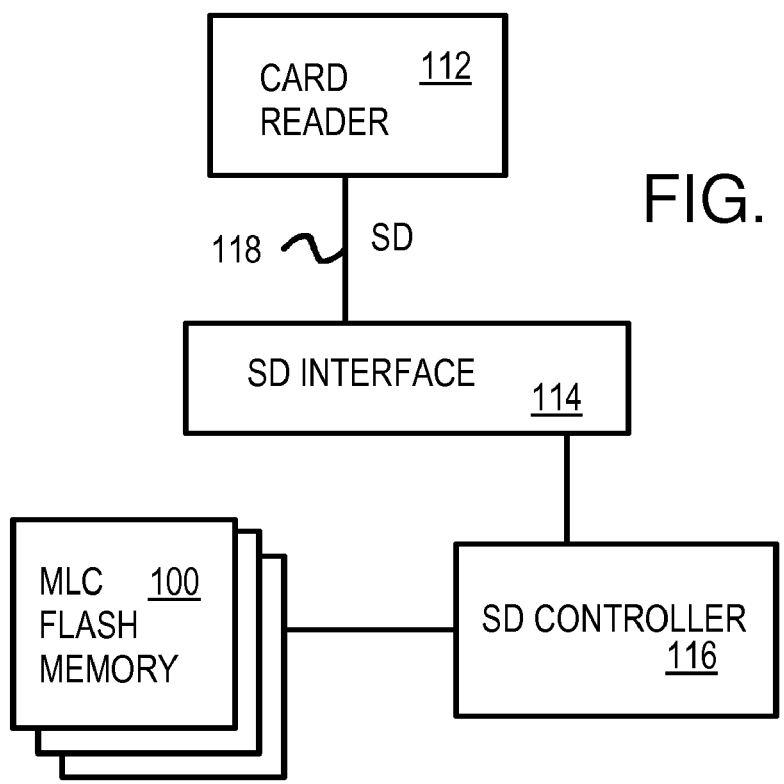
Figure 8C:
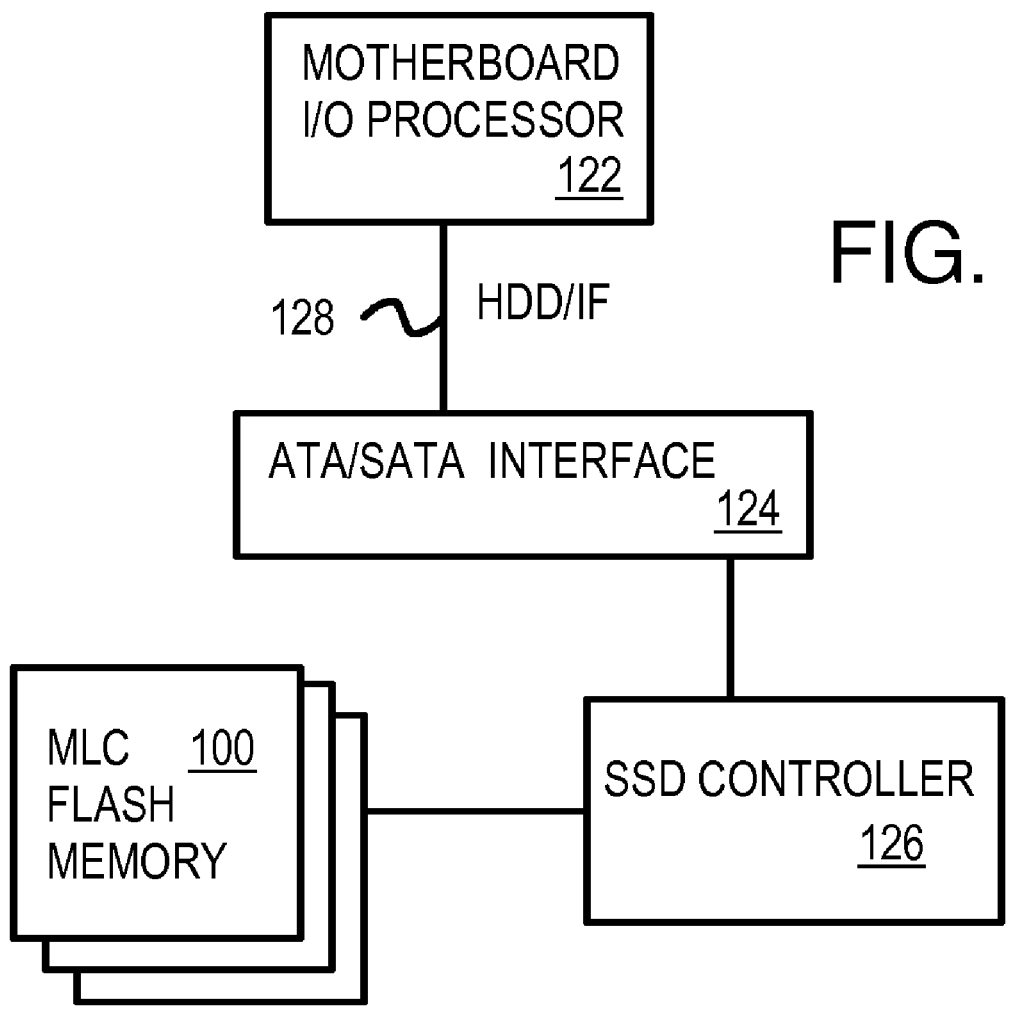

FIGS. 8A-C show application environments of the two-level look-up table. In FIG. 8A, MLC flash memory 100 is part of a Universal-Serial-Bus (USB) device such as a USB keychain drive. Controller 106 contains first-level look-up table 30 and second-level look-up table 32 in its flash controller block. USB controller 104 communicates with host computer 102 over USB bus 108. USB controller 104 and controller 106 may be integrated together and located on the USB device, along with MLC flash memory 100. MLC flash memory 100 is restrictive memory that does not allow regressive page writes.

In FIG. 8B, MLC flash memory 100 is part of a Secure Digital (SD) card. SD controller 116 contains first-level look-up table 30 and second-level look-up table 32 in its flash controller block. SD interface 114 communicates with card reader 112 over SD bus 118. SD interface 114 and SD controller 116 may be integrated together and located on the SD card, along with MLC flash memory 100.

In FIG. 8C, MLC flash memory 100 is part of a solid-state disk (SSD) device that uses the Serial AT-Attachment (SATA) or AT-Attachment (ATA) interfaces to a personal computer motherboard. Controller 126 contains first-level look-up table 30 and second-level look-up table 32 in its flash controller block. ATA/SATA interface 124 communicates with motherboard I/O processor 122 on a host computer motherboard over hard-disk-drive interface bus 128. ATA/SATA interface 124 and controller 126 may be integrated together and located on the SSD device, along with MLC flash memory 100.

Alternate Embodiments

Several other embodiments are contemplated by the inventors. Some fields in FIG. 1B may be repeated for all pages in the physical block, or just be present once, such as for the first page in the block. The spare area may be divided into area for each page in the block, or may have just one area for the whole block. The ECC field may be for the whole block, or on a per-page basis. Additional valid and erased bits may be added, as can other management information.

Rather than find the empty block with the absolute lowest wear-level count, the selected empty block may have a relatively low wear-level count, such as in the lowest 5% of wear-level counts. Various procedures may be used and substituted. While there may be significant restrictions on page writes, reads may be performed with little or no restrictions, including regressive page-reads.

The number of pages per block can be 4, 8, 16, 32, 64, or some other number. The number of physical blocks in the system can increase, and blocks can be partitioned among data and overhead pools in various ways and also dynamically. The sector size could vary from the 512-byte sector described. The page size can be 512 bytes, 2K, 4K bytes or higher, and could dynamically vary with the bits-per-cell indicator for multi-level cell flash memory, but the sector size inherited from hard disk drives may remain 512 bytes for compatibility reasons. Other bits may be stored with each page or with each block, such as LRU bits, management or coherency bits, dirty bits, other counters, etc.

Various sense amps, latches, pre-charge, logic, buffering, and other circuitry could be added. A variety of floating-gate and other technologies could be used for cell storage.

Some blocks may be faulty and are removed from the pool of erased blocks. A flash-memory controller may implement the functions described and be located on a flash-memory card or motherboard or other card. A host bus such as a Peripheral Component Interconnect Express (PCIE) bus with a PCIE interface, or a USB interface to a USB bus may be added. Rather than being on a card, the device might be a module or may be located on one or more chips or on several boards or on a motherboard.

While the invention has been described using an SD controller, a MMC controller may be substituted. A combined controller that can function for both MMC and SD may also be substituted. SD may be considered an extension of MMC, or a particular type of MMC, rather than a separate type of bus. Other buses may be used such as Micro-SD, Memory Stick, PCI Express bus, Compact Flash (CF), IDE bus, Serial ATA (SATA) bus, etc. Additional pins can be added or substituted for the bus data pins. A multi-bus-protocol chip could have an additional personality pin to select which bus interface to use, or could have programmable registers. Rather than have a SD controller, a Memory Stick microcontroller could be substituted, for use with a memory-stick interface, etc.

Different kinds of flash memory may erase to 0, and only allow writing to 1, not writing from 1 to 0. Some flash memory may allow page erase, rather than whole block erase. Events may occur exactly when described, or could occur at other times. Valid bits may change to the erased state near but not exactly at the time of physical erasing, such as before or after the actual erase operation. Pipelining, buffering, and other time-shifting operations may be used. Wait states that delay operations may be added, such as when erasing is very slow.

Other algorithms could be used, such as counting backwards in binary code, gray code, or using 2's complement, or right-shifting zeros. Incrementing can refer to decrementing, and bits could be set to 0 rather than just set to 1, or cleared to 1, since inverted bit states or polarities may be used. The modulo divider may simply move the decimal place over when dividing by a power of two, with the bits to the right of the moved decimal being the remainder and the bits to the left of the moved decimal being the quotient. The location of the decimal point may be implied rather than explicitly stored as data or information.

Counters could contain many bits, such as 32 bits rather than 8 bits, allowing for counting up to 32 without erasing from 0 to 1. Counting sequences that minimize bit changes from 0 to 1 could be used, with bit changes from 0 to 1 occurring when a new current block is started, perhaps by skipping other values in the sequence. Since old blocks are erased, a large count value may not be needed, as the count could be reset periodically when all block have been erased.

The page-valid bits could be active-high or active-low, and could be combined such as by encoding or compression.

Many other sequences may be substituted. Various other steps such as validating data may be added. The flash-memory card may have its own flash-memory array or may use flash memory on another bus, such as on a USB flash card. Some caching operations or other workload could be processed by the host or by another processor such as the I/O processor, and could be partitioned among software, firmware, and hardware. The flash-memory card could be a printed-circuit board (PCB), a smaller plug-in card or device, a device with an external chassis, a board or rack in a larger chassis, or may be integrated with other components or with the host. The data stored may come from one or more hosts, peripheral devices, bus masters, or various other sources.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A flash-memory sub-system comprising:
   a flash-memory array of physical blocks of flash memory identified by a physical-block address (PBA), a physical block in the flash-memory array of physical blocks having a plurality of pages, a page in the plurality of pages having a data sector that can be written with arbitrary data only once before requiring an erase of the physical block;
   wherein the data sector is block-addressable and not randomly-addressable, wherein all bytes of the data sector are accessible together as a block and not accessible as individual bytes;
   a data area formed from physical blocks of flash memory in the flash-memory array;
   wherein each page in the plurality of pages in the physical blocks stores host data from a host in the data sector for the page;
   a logical-sector address (LSA) received from the host, the LSA from the host being a host address for the host data from the host;
   a first-level volatile lookup table having a plurality of mapping entries, wherein each mapping entry in the plurality of mapping entries is for storing a PBA mapping to a physical block in the flash-memory array of physical blocks for a logical block address (LBA);
   a second-level volatile lookup table having a plurality of rows, wherein each row in the plurality of entries is for storing a plurality of page-valid bits that indicate when pages in the plurality of pages in a physical block in the flash-memory array of physical blocks contain valid host data; and
   a modulo generator, receiving the LSA from the host, for performing a modulo operation on the LSA to generate a modulo remainder that identifies a selected page-valid bit in a selected row of the second-level volatile lookup table, the modulo generator also generating a quotient that is the LBA that is applied to the first-level volatile lookup table to select a selected mapping entry;
   the selected mapping entry for storing a PBA mapping indicating a selected physical block in the flash-memory array of physical blocks for storing host data identified by the LSA;
   wherein the PBA mapping from the selected mapping entry of the first-level volatile lookup table is applied to the second-level volatile lookup table to select the selected row in the plurality of rows;
   wherein the flash-memory array is restrictive, allowing writes to pages in the plurality of pages in an ascending page order within a physical block in the flash-memory array of physical blocks, wherein regressive page-writes to a page in the plurality of pages in a descending order is prohibited;
   regressive page-write detector means, receiving a subset of the page-valid bits from the selected row, the subset comprising page-valid bits that are for pages in the plurality of pages after a page in the plurality of pages for the selected page-valid bit, for signaling a regressive page-write when any page-valid bit in the subset of the page-valid bits indicates valid host data;
   whereby regressive page-writes are detected from the page-valid bits from the second-level volatile lookup table and whereby the first-level volatile lookup table stores the PBA mapping that selects a row of the page-valid bits in the second-level volatile lookup table.

2. The flash-memory sub-system of claim 1 further comprising:
   block relocator means, activated by the regressive page-write detector means when the regressive page-write is signaled, for copying valid pages of host data from the selected physical block to a new physical block in the flash-memory array of physical blocks; and
   write ordering means for writing the host data to a selected page in the plurality of pages in the new physical block when the regressive page-write is signaled, wherein the host data is written into the new physical block in an ascending page order when the block relocator means copies valid pages in the plurality of pages,
   whereby pages in the plurality of pages are written into the new physical block in ascending page order.

3. The flash-memory sub-system of claim 2 further comprising:
   mapping entry update means for replacing a PBA mapping for the selected physical block with a PBA mapping the new physical block in the selected mapping entry in the first-level volatile lookup table when the regressive page-write is signaled;
   row copy means for copying the page-valid bits from the selected row to a new selected row in the second-level volatile lookup table when the regressive page-write is signaled,
   whereby mapping entries and rows are updated when the regressive page-write is signaled.

4. The flash-memory sub-system of claim 1 further comprising:
   a wear-leveling-counter pool formed from wear-leveling counter physical blocks of flash memory in the flash-memory array;
   a current wear-leveling counter physical block in the flash-memory array of physical blocks;
   a plurality of wear-leveling counters stored in the current wear-leveling counter physical block, wherein the plurality of wear-leveling counters includes a wear-leveling counter for each physical block, and for each wear-leveling counter physical block, whereby wear-leveling counters track wear of physical blocks of flash memory.

5. The flash-memory sub-system of claim 4 further comprising:
wear-level selector means for selecting a new physical block by examining the plurality of wear-leveling counters stored in the current wear-leveling counter physical block,
whereby the new physical block is selected by examining wear-leveling counters.

6. The flash-memory sub-system of claim 5 further comprising:
a history counter stored in each wear-leveling counter physical block, the history counter indicating a youngest wear-leveling counter physical block in the wear-leveling-counter pool, wherein the youngest wear-leveling counter physical block is the current wear-leveling counter physical block.

7. The flash-memory sub-system of claim 5 further comprising:
replacement means for replacing the current wear-leveling counter physical block with a new current wear-leveling counter physical block in the wear-leveling-counter pool when the selected physical block is erased and its wear-leveling counter needs to be updated,
whereby the current wear-leveling counter physical block is replaced.

8. The flash-memory sub-system of claim 1 further comprising:
a Secure Digital (SD) interface to a SD bus, wherein host requests with the LSA and the host data are received over the SD bus;
whereby flash-memory sub-system connects to the host through the SD interface.

9. The flash-memory sub-system of claim 1 further comprising:
a Serial AT-Attachment (SATA) interface to a SATA bus, wherein host requests with the LSA and the host data are received over the SATA bus;
whereby flash-memory sub-system connects to the host through the SATA interface.

10. The flash-memory sub-system of claim 1 further comprising:
a Universal-Serial-Bus (USB) interface to a USB bus, wherein host requests with the LSA and the host data are received over the USB bus;
whereby flash-memory sub-system connects to the host through the USB interface.

11. A method for writing pages of data to a restrictive flash memory that does not allow regressive page writes comprising:
receiving a logical page number (LPN) from a host computer;
dividing the LPN by a number of pages per block to generate a quotient and a remainder;
using the quotient as an index into a first-level look-up table to locate a mapping entry;
reading a physical-block address (PBA) from the mapping entry in the first-level look-up table;
using the PBA read from the mapping entry of the first-level look-up table as an index into a second-level look-up table to locate a selected row for the PBA;
reading page-valid bits from the selected row of the second-level look-up table;
determining when the host computer is requesting a regressive page-write;

when the host computer is not requesting the regressive page-write, writing page data from the host computer to a selected page in a selected block of the restrictive flash memory, wherein the selected block is identified by the PBA, and wherein the selected page in the selected block is identified by the remainder, and setting a selected page-valid bit in the selected row of the second-level look-up table, wherein the selected page-valid bit is located within the selected row by the remainder;
when the host computer is requesting the regressive page-write,
identifying a new block that is empty of valid data;
copying valid pages of data from an old block identified by the PBA to the new block;
writing the page data from the host computer to a selected page in the new block, wherein the selected page in the new block is identified by the remainder;
wherein copying the valid pages of data from the old block and writing the page data from the host computer are performed together in ascending page order wherein regressive page-writes are prohibited;
over-writing the PBA in the mapping entry with a new PBA that identifies the new block;
copying the page-valid bits read from the selected row to a new selected row in the second-level look-up table, wherein the new selected row is located by the new PBA; and
setting a selected page-valid bit in the new selected row of the second-level look-up table, wherein the selected page-valid bit is located within the new selected row by the remainder,
whereby the regressive page-write forces copying of the valid pages of page-data from the old block to the new block.

12. The method of claim 11 wherein determining when the host computer is requesting the regressive page-write comprises:
using the remainder to select a subset of the page-valid bits above the selected page-valid bit within the selected row;
wherein the subset of the page-valid bits are for pages later than the selected page in a page-writing sequence that is not regressive;
indicating the regressive page-write when any page-valid bits in the subset are set,
whereby the subset of the page-valid bits from the second-level look-up table detects when the regressive page-write occurs.

13. The method of claim 12 further comprising:
combining the page-valid bits in the subset using a logical-OR function to generate a detect signal that indicates that the regressive page-write is requested.

14. The method of claim 13 wherein the subset of the page-valid bits further comprise the selected page-valid bit,
whereby over-writing the selected page triggers detection of the regressive page-write.

15. The method of claim 12 further comprising:
when the host computer is requesting the regressive page-write:
reading a sequential count for the old block;
incrementing the sequential count to generate a new sequential count,
whereby the sequential count is incremented when the regressive page-write forces copying of the valid pages of data from the old block to the new block.

16. The method of claim 15 further comprising:

when the host computer is requesting the regressive page-write;

over writing the sequential count with the new sequential count in the mapping entry in the first-level look-up table, whereby the sequential count is stored in the first-level look-up table.

17. The method of claim 11 wherein identifying a new block that is empty of valid data further comprises:

reading a plurality of wear counters from a wear-level-counter physical block;

finding a lowest wear counter in the plurality of wear counters;

wherein the lowest wear counter in the wear-level-counter physical block corresponds to the new block.

18. The method of claim 11 further comprising:

locating a wear-level-counter physical block by reading block identifiers for blocks in the restrictive flash memory to find a wear block identifier that indicates the wear-level-counter physical block;

reading a plurality of wear counters from the wear-level-counter physical block;

finding a first lowest wear counter in the plurality of wear counters;

wherein the first lowest wear counter in the wear-level-counter physical block corresponds to the new block;

finding a second lowest wear counter in the plurality of wear counters;

wherein the second lowest wear counter in the wear-level-counter physical block corresponds to a second new block;

incrementing the first lowest wear counter to generate a first incremented wear counter;

incrementing the second lowest wear counter to generate a second incremented wear counter;

copying unchanged wear counters in the plurality of wear counters from the wear-level-counter physical block to the second new block;

wherein the unchanged wear counters in the plurality of wear counters exclude the first lowest wear counter and the second lowest wear counter;

writing the first incremented wear counter to the second new block;

writing the second incremented wear counter to the second new block;

writing the wear block identifier to the second new block to identify the second new block as a second wear-level-counter physical block; and erasing the wear-level-counter physical block, whereby the plurality of wear counters in the wear-level-counter physical block are relocated when wear counters are incremented.

* * * * *